(12) United States Patent
Escobar et al.

(10) Patent No.: US 10,043,324 B1
(45) Date of Patent: Aug. 7, 2018

(54) ESSENTIAL INSPECTION SYSTEM FOR MACHINES

(71) Applicants: Alberto D. Escobar, Cali (CO); Carlos Porras, Cali (CO)

(72) Inventors: Alberto D. Escobar, Cali (CO); Carlos Porras, Cali (CO)

(73) Assignee: E y S INGENIERIA DE COLOMBIA LTDA, Cali (CO)

( * ) Notice: Subject to any disclaimer, the term of this patent is extended or adjusted under 35 U.S.C. 154(b) by 0 days.

(21) Appl. No.: 15/698,825

(22) Filed: Sep. 8, 2017

(51) Int. Cl.
| | | |
|---|---|---|
| *G07C 5/08* | (2006.01) | |
| *B60R 16/023* | (2006.01) | |
| *B60C 23/04* | (2006.01) | |
| *G05D 1/02* | (2006.01) | |
| *H04B 1/08* | (2006.01) | |
| *G06Q 10/00* | (2012.01) | |

(52) U.S. Cl.
CPC ........ *G07C 5/0841* (2013.01); *B60R 16/0234* (2013.01); *G07C 5/0808* (2013.01); *G07C 5/0816* (2013.01); *B60C 23/0479* (2013.01); *G05D 1/028* (2013.01); *G06Q 10/20* (2013.01); *G07C 2205/02* (2013.01); *H04B 1/082* (2013.01)

(58) Field of Classification Search
None
See application file for complete search history.

(56) References Cited

U.S. PATENT DOCUMENTS

2015/0338848 A1* 11/2015 Kumar ................ G07C 5/0816
701/70

* cited by examiner

*Primary Examiner* — Kristy A Haupt
(74) *Attorney, Agent, or Firm* — Martinez Patents PC; John J. Martinez

(57) ABSTRACT

The present invention provides a system wherein an essential inspection of components of a machine or vehicle is performed and wherein the inspected components do no need to be brought into close proximity to the mechanism or device that activates the starting element of the machine. Moreover, the system of the present invention allows extending the essential safety inspection to those machine components that cannot be removed or are no practical to remove in order to be inspected. Still, the present invention provides a system that forces the safety essential inspection of machine components to be performed by not allowing the electrical feeding of the ignition mechanism that start the operation of the machine unless the essential inspection system is activated by completing a predetermined protocol or sequence of inspection steps.

8 Claims, 4 Drawing Sheets

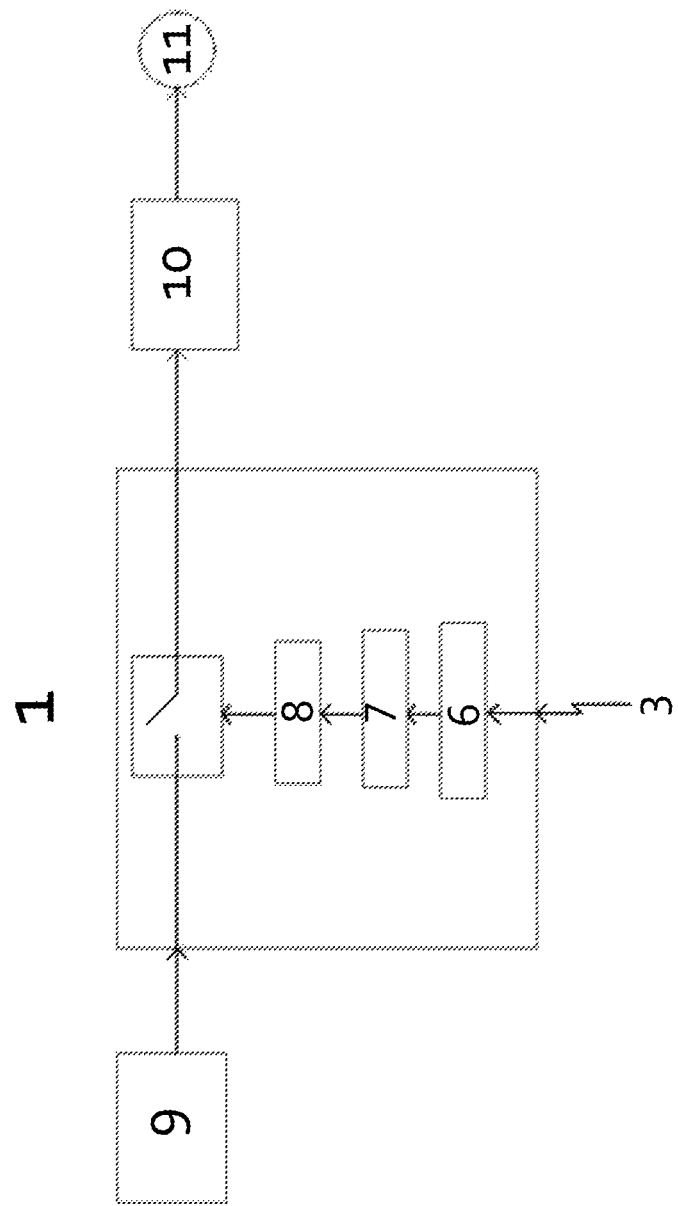

ESSENTIAL INSPECTION SYSTEM FOR MACHINES

BACKGROUND OF THE INVENTION

1. Field of the Invention

The present invention is related to an essential inspection system of certain components of a vehicle or machine wherein the machine would not start operation unless an essential inspection of the components of the machine is performed. Therefore, the system of the present invention would be used in a broad variety of industries wherein certain components of a machine are required to be inspected before the machine is started to ensure the machine operates safely.

2. Description of Prior Art

To ensure safety, some machines or vehicles require a necessary or essential inspection of their components before the machines or vehicles are started to operate. Usually the machines are started by means of an electrical ignition system that is activated once the essential safety inspection of their components is performed. For example, Bartollotta, V. I. and Green, J. described in U.S. Pat. No. 9,159,172 describe checking equipment wherein the machine component to be inspected has to be removed from the machine and wherein the component inspected has to be put in close proximity to a master module causing the master module to unblock the ignition that starts the machine The present invention provides a system that forces the essential inspection to be performed. However the present invention overcomes the above mentioned limitation, avoiding the necessity to remove the component to be inspected and the need of a physical close proximity to the mechanism or element, e.g. a master module, that activates the ignition or starting device that initiates the operation of the machine.

SUMMARY OF THE INVENTION

The present invention provides a system wherein an essential inspection of components of a machine or vehicle is performed and wherein the inspected components do no need to be brought into close proximity to the mechanism or device that activates the starting element of the machine. Moreover, the system of the present invention allows extending the essential safety inspection to those machine components that cannot be removed or are no practical to remove in order to be inspected. Still, the present invention provides a system that forces the safety essential inspection of machine components to be performed by not allowing the electrical feeding of the ignition mechanism that start the operation of the machine unless the essential inspection system is activated by completing a predetermined protocol or sequence of inspection steps.

Specifically, the present invention provides an inspection system for operating a machine, where said system comprises:

A. at least two sensors, wherein each one of the sensors is permanently located next to a corresponding component of the machine;
B. a central module on the machine, wherein each one of the sensors can be actuated to transmit distantly an individual specific signal to the central module, wherein the central module can receive individual specific signals from the sensors, wherein the central module can identify each sensor specific individual signal, wherein the central module can be programmed to recognize a precise sequence pattern of individual specific sensor signals;

wherein the machine has an ignition system; wherein each one of the sensors can be actuated to send a single individual specific signal to the central module when the corresponding machine component is inspected; wherein the central module activates only one time the machine ignition system when said central module receives a precise sequence pattern of specific individual sensor signals, wherein the central module was programmed to recognized said precise sequence pattern of specific individual sensor signals; wherein the ignition system is not activated unless said ignition system is activated by the central module; wherein a single activation of the machine ignition system allows a single start of the machine operation; wherein the machine does not operate unless said machine operation is allowed to be started by the ignition system.

In one aspect of the inspection system of the present invention, the sensors send signals to the central module by means of wires.

In another aspect of the inspection system of the present invention, the sensors send signals to the central module wirelessly.

In one more aspect of the inspection system of the present invention, the sensors are actuated to transmit an individual specific signal to the central module by touch.

In a second embodiment of the inspection system for operating a machine of the present invention, the system comprises:

A. at least two sensors, wherein each one of the sensors is permanently located next to a corresponding component of the machine;
B. a central module on the machine, wherein each one of the sensors can be actuated to transmit distantly an individual specific signal to the central module, wherein the central module can receive individual specific signals from the sensors, wherein the central module can identify each sensor specific individual signal, wherein the central module can be programmed to recognize a precise sequence pattern of individual specific sensor signals;
C. A portable unit;

wherein the machine has an ignition system; wherein each one of the sensors can be actuated to send a single individual specific signal to the central module when the corresponding machine component is inspected; wherein the portable unit actuates wirelessly on each one of the sensors to send a single individual specific signal to the central module when the corresponding machine component is inspected; wherein the central module activates only one time the machine ignition system when said central module receives a precise sequence pattern of specific individual sensor signals, wherein the central module was programmed to recognized said precise sequence pattern of specific individual sensor signals; wherein the ignition system is not activated unless said ignition system is activated by the central module; wherein a single activation of the machine ignition system allows a single start of the machine operation; wherein the machine does not operate unless said machine operation is allowed to be started by the ignition system.

In an aspect of the second embodiment of the inspection system of the present invention the sensors are actuated to transmit an individual specific signal to the central module by means of the portable unit, wherein the portable unit actuates on each sensor wirelessly, wherein each one of the actuated sensors sends wirelessly an individual specific signal back to the portable unit, and wherein the portable unit sends said individual specific signal to the central module.

In an additional aspect of the inspection system of the present invention, the central module records logs of the inspection system.

In another aspect of the second embodiment of the inspection system of the present invention, the central module records logs of the inspection system.

BRIEF DESCRIPTION OF THE DRAWINGS

FIG. 4. shows a schematic representation of the central module (1) of the inspection system of the present invention.

DETAILED DESCRIPTION OF THE INVENTION

Figure 1:
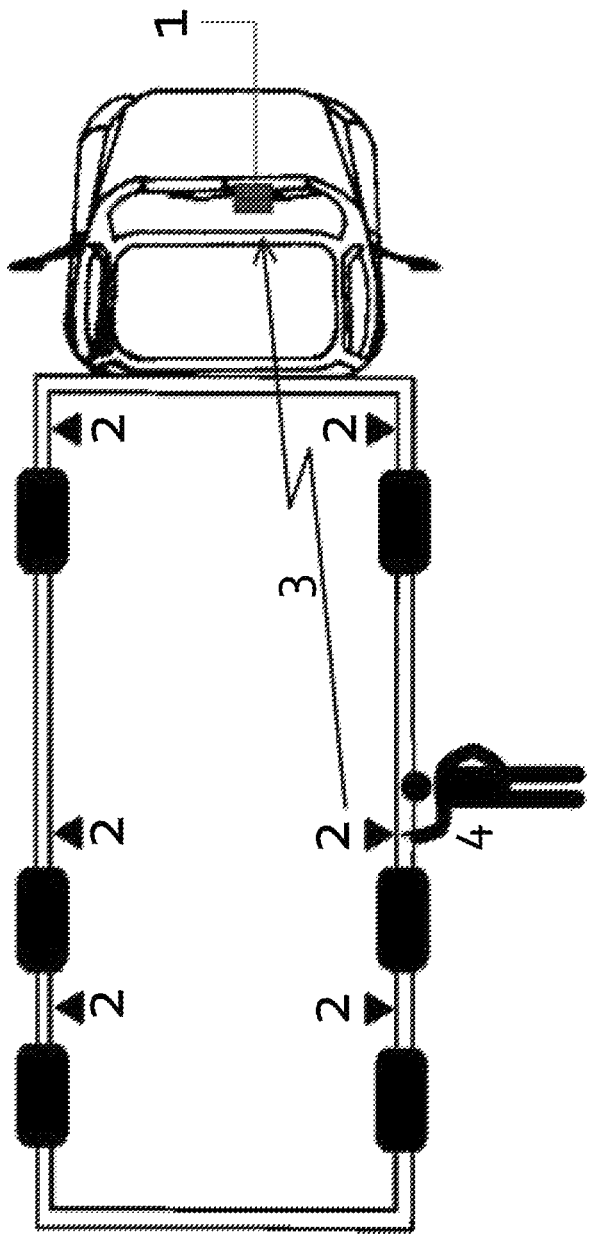
FIG. 1. shows the inspection system of the present invention on a vehicle wherein sensors (2) are located at the component to be inspected, distant to a central module (1), and wherein the sensors (2) are actuated by touch (4) to send a signal (3) to the central module (1).
Figure 2:
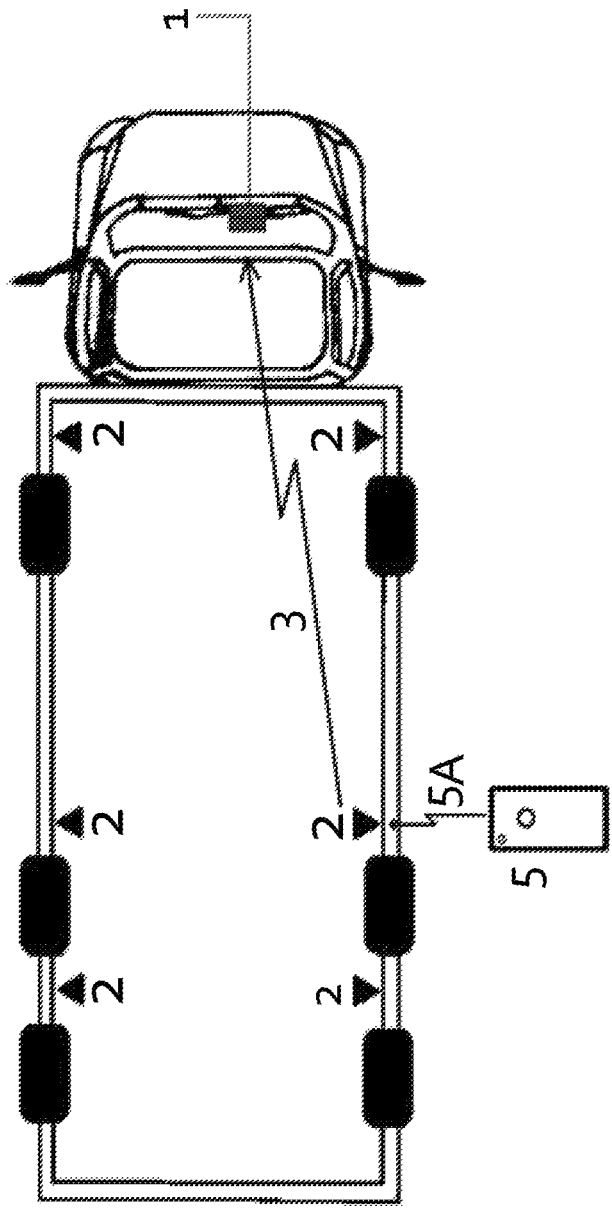
FIG. 2. shows a second embodiment of the inspection system of the present invention on a vehicle wherein sensors (2) are located at the component to be inspected, distant to a central module (1), and wherein the sensors (2) are actuated by a portable unit (5) to send a signal (3) to the central module (1).
Figure 3:
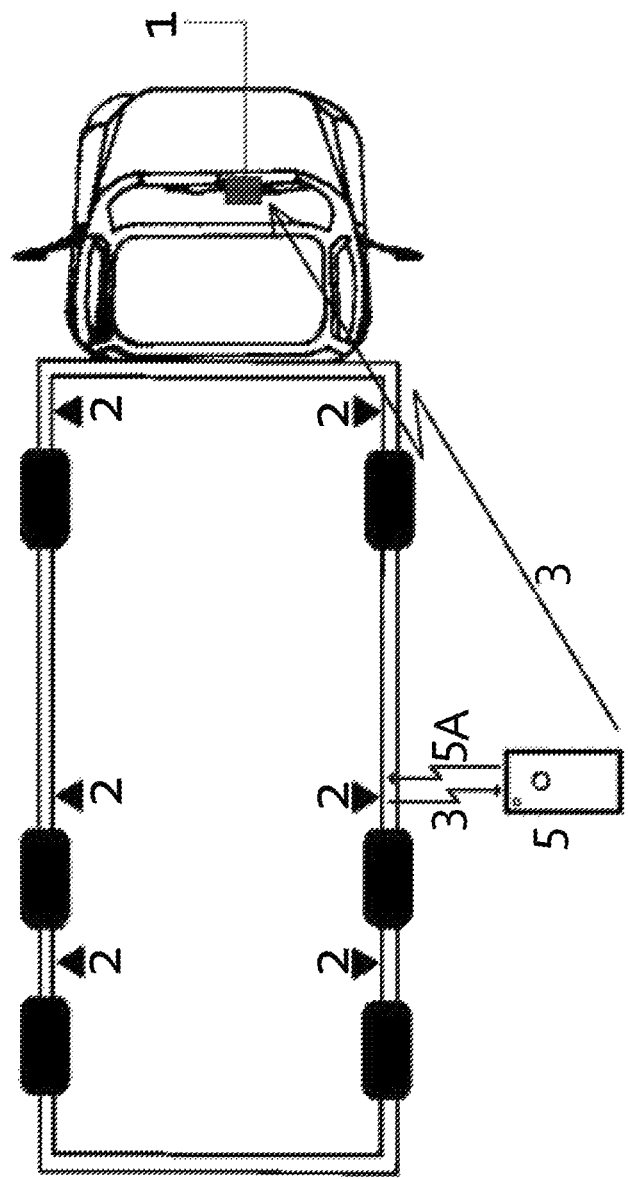
FIG. 3. shows a second embodiment of the inspection system of the present invention on a vehicle wherein sensors (2) are located at the component to be inspected, distant to a central module (1), wherein the sensors (2) are actuated by a portable unit (5) to send a signal back to the portable unit (5), and wherein the portable unit subsequently sends the signal (3) to the central module (1).

FIG. 1 shows a first embodiment of inspection system for operating a machine of the present invention, wherein the system comprises:
  A. at least two sensors (2), wherein each one of the sensors (2) is permanently located next to a corresponding component of the machine;
  B. a central module (1) on the machine, wherein each one of the sensors (2) can be actuated to transmit distantly an individual specific signal (3) to the central module (1), wherein the central module (1) can receive individual specific signals (3) from the sensors (2), wherein the central module (1) can identify each sensor specific individual signal (3), wherein the central module (1) can be programmed to recognize a precise sequence pattern of individual specific sensor signals (3);
wherein the machine has an ignition system (FIG. 4)(10); wherein each one of the sensors (2) can be actuated to send a single individual specific signal (3) to the central module (1) when the corresponding machine component is inspected; wherein the central module (1) activates only one time the machine ignition system (10) when said central module (1) receives a precise sequence pattern of specific individual sensor signals (3), wherein the central module (1) was programmed to recognized said precise sequence pattern of specific individual sensor signals (3); wherein the ignition system (10) is not activated unless said ignition system (10) is activated by the central module (1); wherein a single activation of the machine ignition system (10) allows a single start of the machine operation; wherein the machine does not operate unless said machine operation is allowed to be started by the ignition system (10).

In one aspect of the inspection system of the present invention, the sensors (2) send signals (3) to the central module (1) by means of wires.

In another aspect of the inspection system of the present invention, the sensors (2) send signals (3) to the central module (1) wirelessly.

In one more aspect of the inspection system of the present invention, the sensors (2) are actuated to transmit an individual specific signal (3) to the central module (1) by touch (4).

For the purpose of this Patent Application the term machine comprises any kind of vehicle used for industrial or commercial purposes like trucks, excavators, backhoe loaders, etc.

For the purpose of this Patent Application, the sensors (2) are located at inspection points next to the components of the machine that are essential or required to be physically or visually inspected. The inspection of each component is performed by a person who usually is the operator of the machine. The person who performs the inspection of a machine component must do it at the location in the machine where each component and the corresponding sensor (2) are positioned. Once a component of the machine is inspected, the corresponding sensor (2) is actuated upon to send a specific individual signal to the central module (1) by the person performing the inspection. An additional sensor (2) may be located in the machine and said sensor can be actuated to emit an specific signal (3) when the person who perform the machine inspection verify that in the surroundings of the machine there is no persons or objects that can be damaged when the machine is operating. Examples of machine components that are essential to be inspected are tires, oil level, radiator coolant level, brakes, etc. The components to be inspected comprise any component of the machine which can cause the machine failure if said component is damaged or does not meet the conditions to function properly. The term component in this patent application also includes any fluid necessary for operation of the machine.

For the purpose of this Patent Application the term sensor (2) comprises any kind of active or passive device selected from a broad variety of sensors available on the market, for example:
RIFD sensors,
NFC sensors,
E BUTTON sensors,
Bluetooth sensors,
ZIGBEE sensors,
ZWAVE sensors,
etc.

The term sensor (2) also comprises sensors that in addition to the mentioned above, are able to emit a signal (3) by way of a wire, and sensors able to emit a signal (3) wirelessly. The term sensor further comprises sensors that can be actuated to send the signal (3), by touch (4), or by proximity with a portable unit (5).

The specific individual signal (3) generated by each sensor (2), in the present invention, comprises any kind of ID code, for example, analog, digital, etc., wherein the ID code must be specific for each sensor (2).

For the purpose of this Patent Application the term "central module" (FIGS. 1, 2, 3 and 4) (1) comprises an electronic box device located at the machine control panel. If the machine is a moving vehicle, the central module (1) is usually located at the cab of the vehicle. The central module (1) contains a signal receiver (6), wherein the signal receiver can be wired or wireless. The central module (1) also contains a signal validation processor (7) wherein the signal validation processor (7) is able to identify the specific individual signal (3) ID code from each sensor (2). The signal validation processor (7) can be programmed to recognize a specific sequence of at least two different specific individual signals (3). In the present invention, therefore, the inspection of components of the machine must be performed with a predetermined sequence or order. In addition, the central module (1) contains an ignition enabler (8), where the ignition enabler (8) default status is inactivated. The ignition enabler (8) is activated by the signal validation processor (7), only once, when the signal validation processor (7) has been programmed to recognize a specific sequence of signals (3) and the signal receiver (6) has received said specific sequence of signals (3) from the sensors (2). Each sensor (2) on the machine emits a specific individual signal only when said sensor (2) has been actuated upon, once the correspondent machine component has been inspected by the person performing the inspection. Consequently, in order for the machine to be started to operate, a completed inspection of a determined number of machine components in a predetermined sequence is essential for the ignition enabler (8) to be activated each single time. A single activation of the ignition enabler (8) allows, just one time, the flow of feeding electricity current from an electricity current source (9) throughout the central module (1) to an ignition motor (10) that starts (11) the machine operation. Therefore, Every time the machine is turned off, a completed safety inspection of determined number of machine components is essential for the machine to be started to operate again.

In the present invention the central module (1) has a memory part, wherein the memory part records the log of all the signals (3) received by the central module (1). The memory part of the central module (1) would preferably be incorporated into the signal validation processor (7).

In a second embodiment of the present invention the inspection system for operating a machine comprises:
  A. at least two sensors (2), wherein each one of the sensors (2) is permanently located next to a corresponding component of the machine;
  B. a central module (1) on the machine, wherein each one of the sensors (2) can be actuated to transmit distantly an individual specific signal (3) to the central module (1), wherein the central module (1) can receive individual specific signals (3) from the sensors (2), wherein the central module (1) can identify each sensor (2) specific individual signal (3), wherein the central module (1) can be programmed to recognize a precise sequence pattern of individual specific sensor signals (3);
  C. A portable unit (FIGS. 2 and 3)(4);

wherein the machine has an ignition system (FIG. 4)(10); wherein each one of the sensors (2) can be actuated to send a single individual specific signal (3) to the central module (1) when the corresponding machine component is inspected; wherein the portable unit (5) actuates wirelessly on each one of the sensors (2) to send a single individual specific signal (3) to the central module (1) when the corresponding machine component is inspected; wherein the central module (1) activates only one time the machine ignition system (10) when said central module (1) receives a precise sequence pattern of specific individual sensor signals (3), wherein the central module (1) was programmed to recognized said precise sequence pattern of specific individual sensor signals (3); wherein the ignition system (10) is not activated unless said ignition system (10) is activated by the central module (1); wherein a single activation of the machine ignition system (10) allows a single start of the machine operation; wherein the machine does not operate unless said machine operation is allowed to be started by the ignition system (10).

In an aspect of the second embodiment of the inspection system of the present invention the sensors (2) are actuated to transmit an individual specific signal (3) to the central module (1) by means of the portable unit (5), wherein the portable unit (5) actuates on each sensor (2) wirelessly, wherein each one of the actuated sensors (2) sends wirelessly an individual specific signal (3) back to the portable unit (5), and wherein the portable unit (5) sends said individual specific signal (3) to the central module (1).

In the second embodiment of the present invention, the portable unit (5) actuates by a proximity stimulus (5A) on the sensors (2), where each sensor (2) upon actuation by the portable unit emit a specific individual signal (3). The portable unit (5) would preferably have a portable unit touch bottom that is pressured in order to emit a portable unit proximity stimulus (5A).

In an additional aspect of the second embodiment of the inspection system of the present invention, the portable unit (5) has a memory part, wherein the portable unit memory part logs all signal activity that traffics through said portable unit (5).

Although this description presents preferred embodiments of the present invention, additional changes may be made in the form and disposition of the parts without deviating from the ideas and basic principles encompassed by the claims.

The invention claimed is:
1. An inspection system for operating a machine, where said system comprises:
  A. at least two sensors, wherein each one of the sensors is permanently located next to a corresponding component of the machine;
  B. a central module on the machine, wherein each one of the sensors can be actuated to transmit distantly an individual specific signal to the central module, wherein the central module can receive individual specific signals from the sensors, wherein the central module can identify each sensor specific individual signal, wherein the central module can be programmed to recognize a precise sequence pattern of individual specific sensor signals;

wherein the machine has an ignition system; wherein each one of the sensors can be actuated to send a single individual specific signal to the central module when the corresponding machine component is inspected; wherein the central module activates only one time the machine ignition system when said central module receives a precise sequence pattern of specific individual sensor signals, wherein the central module was programmed to recognized said precise sequence pattern of specific individual sensor signals; wherein the ignition system is not activated unless said ignition system is activated by the central module; wherein a single activation of the machine ignition system allows a single start of the machine operation; wherein the machine does not operate unless said machine operation is allowed to be started by the ignition system.

2. The inspection system of claim 1 wherein the sensors send signals to the central module by means of wires.

3. The inspection system of claim 1 wherein the sensors send signals to the central module wirelessly.

4. The inspection system of claim 1, wherein the sensors are actuated to transmit an individual specific signal to the central module by touch.

5. The inspection system of claim 1, wherein the central module records logs of the inspection system.

6. An inspection system for operating a machine, where said system comprises:
   A. at least two sensors, wherein each one of the sensors is permanently located next to a corresponding component of the machine;
   B. a central module on the machine, wherein each one of the sensors can be actuated to transmit distantly an individual specific signal to the central module, wherein the central module can receive individual specific signals from the sensors, wherein the central module can identify each sensor specific individual signal, wherein the central module can be programmed to recognize a precise sequence pattern of individual specific sensor signals;
   C. A portable unit;
wherein the machine has an ignition system; wherein each one of the sensors can be actuated to send a single individual specific signal to the central module when the corresponding machine component is inspected; wherein the portable unit actuates wirelessly on each one of the sensors to send a single individual specific signal to the central module when the corresponding machine component is inspected; wherein the central module activates only one time the machine ignition system when said central module receives a precise sequence pattern of specific individual sensor signals, wherein the central module was programmed to recognized said precise sequence pattern of specific individual sensor signals; wherein the ignition system is not activated unless said ignition system is activated by the central module; wherein a single activation of the machine ignition system allows a single start of the machine operation; wherein the machine does not operate unless said machine operation is allowed to be started by the ignition system.

7. The inspection system of claim 6, wherein the sensors are actuated to transmit an individual specific signal to the central module by means of the portable unit, wherein the portable unit actuates on each sensor wirelessly, wherein each one of the actuated sensors sends wirelessly an individual specific signal back to the portable unit, and wherein the portable unit sends said individual specific signal to the central module.

8. The inspection system of claim 6, wherein the central module records logs of the inspection system.

* * * * *